INVENTORS.
JOSEPH F. KRUY
CHITTOOR V. RAMAMOORTHY
BY
Fred Jacob
ATT'Y.

INVENTORS.
JOSEPH F. KRUY
CHITTOOR V. RAMAMOORTHY
BY
Fred Jacob
ATT'Y.

United States Patent Office 3,387,298

Patented June 4, 1968

3,387,298
COMBINED BINARY DECODER-ENCODER EMPLOYING TUNNEL DIODE PYRAMID-ORGANIZED SWITCHING MATRIX

Joseph F. Kruy, West Newton, and Chittoor V. Ramamoorthy, Boston, Mass., assignors to Honeywell Inc., Minneapolis, Minn., a corporation of Delaware Filed Oct. 26, 1964, Ser. No. 406,256
11 Claims. (Cl. 340—347)

The present invention relates in general to high speed electronic switching apparatus and more particularly to a tunnel diode, pyramid-organized switching matrix capable of selectively decoding or encoding applied binary signals.

Decoder and encoder devices form a vital part of many complex electronic systems, especially digital computer systems. The presence of decoder devices in computer systems, for example, makes it possible to utilize an operational address code consisting of only $n$ pairs of binary signals to activate a particular one of $2^n$ address location leads. Encoder devices, on the other hand, provide a means for forming an $n$ digit address code indicative of a selected one of the $2^n$ address location leads.

In the past, high speed decoder devices have generally used diode AND gate circuits connected in a tree- or pyramid-organized switching matrix. Decoders of this type, however, have proved to be comparatively slow in operation and require a large number of diode elements. Such decoders, moreover, fail to provide a means for temporarily storing information which would permit the circuit activating signals to be terminated in advance of the completion of the decoding process. Further, because of the inability of conventional diode decoders to store information temporarily, it is not possible to time-share the decoder. Such time sharing occurs when a second decoder input signal replaces a first decoder input signal which has been acted upon and which resulted in the propagation of information to a subsequent column decoding stage. Conventional diode switching matrices are, by their nature, unilateral, that is to say they permit signal flow in but one direction. Consequently, it is not possible to construct a single diode pyramid switching structure which functions as both a decoder and as an encoder.

It is therefore an object of the present invention to provide a pyramid-organized switching matrix which is capable of selectively functioning as a binary signal decoder or encoder.

It is another object of the present invention to provide a combined decoder-encoder switching matrix which is capable of more rapid operation than heretofore available devices of this kind.

It is a further object of the present invention to provide a diode switching matrix which requires fewer diodes than heretofore available devices of this kind.

It is an additional object of the present invention to provide a combined decoder-encoder pyramid switching matrix which is capable of temporary information storage to permit a time-shared operation.

In the present invention, individual switching stages are arranged in accordance with the well-known tree- or pyramid-organized switching matrix. In such a matrix, each stage in a level or column has its output coupled to a first input of a pair of stages in the next column of decoder stages. The number of stages in each column increases from the apex to the base of the pyramid. In addition, each stage of the matrix receives as a second input signal the decoder input signal assigned to that column, or its complement. Only that stage in each column of the matrix which coincidentally receives a binary one signal from the stage in the preceding column and from its associated decoder signal input terminal, will be activated to propagate a decoded signal to the related stages of a subsequent matrix column.

Instead of using conventional diodes connected as AND gate switching stages as was formerly the case in high speed decoder devices, the present invention employs tunnel diode elements which, when properly adapted for use as decoder stages, not only perform the required AND gate logic, but in addition provide storage of the AND gate signal. The storage of signals in the intermediate columns permits time-shared operation of the matrix, while the absence of conventional diodes or other unilateral devices in the signal propagation path permits the use of the invention as a signal encoder, as well as a signal decoder. Such a circuit is not only capable of faster operation, but in addition there is a substantial reduction in the number of components required in the present invention, as compared to a conventional diode tree matrix.

The features of novelty which characterize the invention are pointed out with particularity in the claims annexed to and forming a part of this specification. For a better understanding of the invention, its advantages and specific objects attained with its use, reference should be had to the accompanying drawings and descriptive matter in which there is illustrated and described a preferred embodiment of the invention.

Figure 1A:
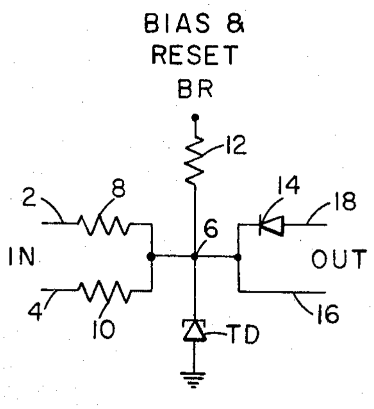
FIGURE 1A is a schematic illustration of one of the tunnel diode switching stages of the present invention.
Figure 3:
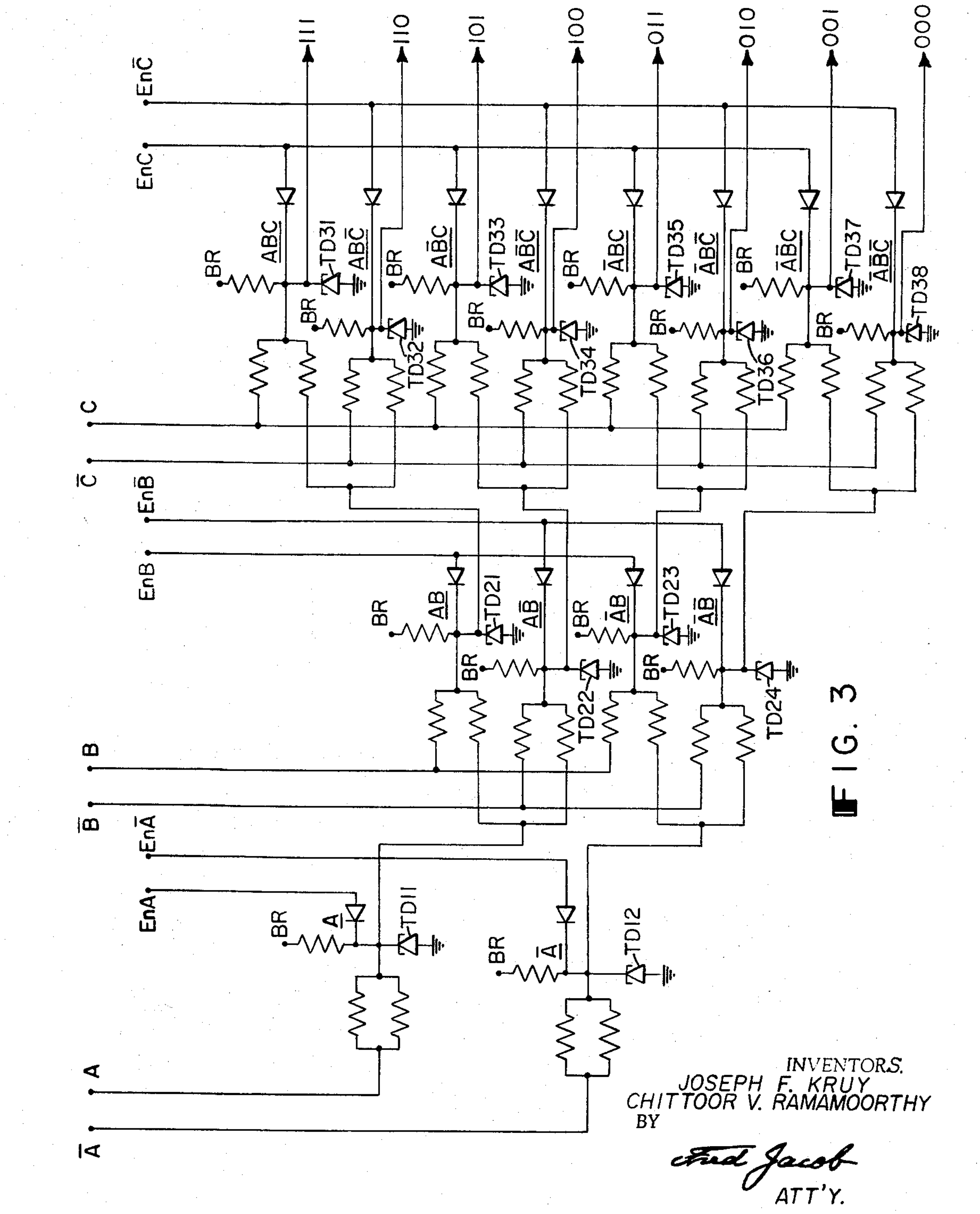
FIGURE 3 illustrates a preferred embodiment of the decoder-encoder matrix of the present invention.

Referring now to FIGURE 1A of the drawings, there is shown one embodiment of the basic tunnel diode switching circuit which is used in each stage of the decoder-encoder device of FIGURE 3. The circuit comprises a pair of leads 2 and 4 which constitute the input of the circuit in the decoder mode of operation. The leads 2 and 4 are coupled to a junction point 6 by way of resistors 8 and 10 respectively. The junction point 6 is further connected to a lead 16, as well as to the cathode of a diode 14 whose anode is connected to a lead 18. The leads 16 and 18 constitute the circuit output in the decoder mode of operation. The leads 2, 4 and 16, 18 are referred to hereinbelow as input leads and output leads respectively, for the sake of ready identification. It will be understood that this designation is operationally applicable only in the decoder mode of operation. The junction point 6 is also connected to the cathode of a tunnel diode TD, the latter having its anode connected to a ground reference terminal. A resistor 12 has one end connected to the junction point 6, while its other end is connected to a terminal BR which is adapted to receive a combined biasing voltage and resetting signal for operation of the tunnel diode circuit.

Figure 1B:
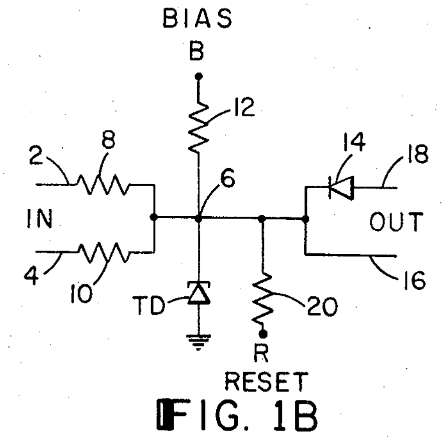
FIGURE 1B is an alternate embodiment of a tunnel diode switching stage which may be used with the present invention.

The circuit of FIGURE 1B differs from that of FIGURE 1A in providing an alternate method for coupling a reset signal to the tunnel diode TD, applicable reference numerals having been retained. In this case, a resistor 20 is connected between junction point 6 and a reset terminal R to couple a reset signal independently to the tunnel diode. Except for this difference, the circuits of FIGURES 1A and 1B are substantially alike.

Figure 2:
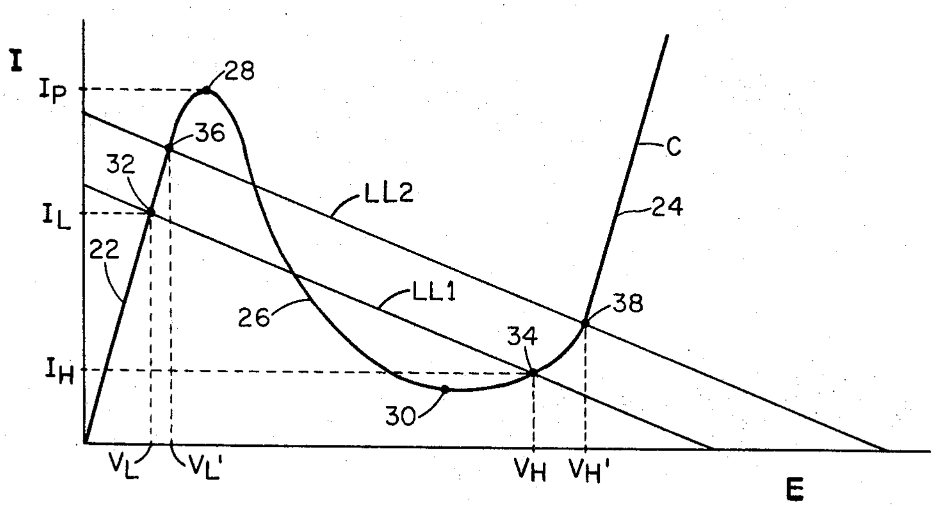
FIGURE 2 is a graphic representation of the voltage-current characteristic curve of a tunnel diode, together with associated operative load lines.

The operation of the tunnel diode stages of FIGURES 1A and 1B are best understood with reference to the tunnel diode characteristic curve shown in FIGURE 2. In FIGURE 2, the characteristic curve C of the tunnel diode TD is seen to have a pair of positive resistance regions 22 and 24 which are separated from a negative resistance region 26 by the peak and valley current points 28 and 30 respectively. By an appropriate selection of the parameters of the biasing source and load resistance 12, it is possible to establish a load line LL1 which intersects each of the positive resistance regions of the tunnel diode at the points 32 and 34, to selectively provide either one of a pair of stable voltages $V_L$ or $V_H$ across the tunnel diode.

The parameters associated with the tunnel diode TD and the load line LL1 are such that when the present invention is operated as a signal decoder, a coincidence of negative input signals of the proper amplitude on the leads 2 and 4 will provide sufficient additional current to shift the operating point to beyond the peak current point 28 and thereby switch the tunnel diode to the stable operating point 34.

When the present invention is operated as a signal encoder, the load line LL2 is established by increasing the voltage of the biasing source applied to the terminal BR of FIGURE 1A, or to the terminal B in FIGURE 1B, so as to position the load line closer to the peak current point 28. The load line LL2 intersects the tunnel diode curve at the stable operating points 36 and 38 to selectively establish the voltages $V_L'$ and $V_H'$ across the tunnel diode. In order to switch the tunnel diode to its high voltage stable state, it is now only necessary to apply a single signal to the lead 16 of the tunnel diode circuits of FIGURES 1A or 1B.

In the present invention, the stable voltages $V_L$ and $V_L'$ are of a low negative value approaching ground potential and are within a range of voltages across the tunnel diode which are, by definition, indicative of its being switched to the binary "zero" state. The voltages $V_H$ and $V_H'$, however, are of a significant negative value and are within a range of values across the tunnel diode indicative of its being switched to the binary "one" state.

In order to reset the tunnel diode from its binary "one" to its binary "zero" state, the biasing voltage applied to the terminal BR of FIGURE 1A is reduced by the action of the reset signal applied to that same terminal. The reset signal lowers the quiescent current through the tunnel diode to a value below the valley current at the point 30 which causes the tunnel diode ot revert to its low voltage stable state. An alternate circuit for resetting the tunnel diode is provided in FIGURE 1B, where the separate reset terminal R is momentarily grounded, or returned to a positive biasing potential, to divert current from the tunnel diode. This action reduces the current through the tunnel diode to a value below the valley current and initiates a resetting action.

Referring now to FIGURE 3 of the drawings, there is shown a preferred embodiment of the present invention in the form of a decoder-encoder switching matrix for three binary digits. The matrix is illustrated using the tunnel diode switching stage shown in FIGURE 1A as a basic building block, a number of such stages being connected in the well-known pyramid configuration. For the three-digit number under consideration, the pyramid consists of three columns, to wit the apex column containing the stages TD11 and TD12, the middle column containing the stages TD21 to TD24 and the base column containing the stages TD31 to TD38. For the sake of clarity, only pertinent reference designations have been retained.

The apex column stages TD11 and TD12 each have their input leads connected together, as well as to a pair of decoder input terminals A and $\overline{A}$ respectively. One of the output leads of each apex stage is connected between the conventional diode associated with that stage and one of a pair of encoder output terminals E*n*A and E*n*$\overline{A}$ respectively. The other output lead from each apex stage is coupled to a pair of input leads associated with different tunnel diode stages of the middle column of the matrix.

The other input lead of each stage in the middle column is connected to one of a pair of decoder input terminals B and $\overline{B}$. One output lead of each of the latter stages is connected to one input lead each of a pair of stages in the base column, while the other output lead is connected to one of a pair of encoder output terminals E*n*B and E*n*$\overline{B}$. Similarly, the other input lead of each of the base column stages is connected to one of a pair of decoder input terminals C and $\overline{C}$, while one output lead of each of the latter stages is connected to one of a pair of output terminals E*n*C and E*n*$\overline{C}$. The remaining output lead of each base column stage is adapted to provide a decoded output signal, if selected in the decoder mode of operation, indicative of a particular three-digit number. In the encoder mode of operation, a selected one of the last-recited leads receives a signal for application to the associated base column stage. These leads are labeled in accordance with the decoder binary digit code which effects their selection, or conversely, the encoder binary digit code they form when selected.

In each column of the pyramid switching matrix, the odd-numbered tunnel diode stages are seen to have one input lead connected to one decoder input terminal associated with that column, while the even numbered tunnel diode stages have the corresponding input lead connected to the complementary decoder input signal terminal associated with that column. In like manner, the odd numbered tunnel diode stages of each column have an output lead unilaterally coupled to one encoder output terminal associated with that column, while the even numbered diode stages have an output lead unilaterally coupled to the complementary encoder output terminal.

The individual tunnel diode stages are further identified by labeling each stage with the Boolean expression which, when satisfied causes a switching of that stage. For example, the tunnel diode stage TD38, labeled $$\underline{\overline{A}\ \overline{B}\ \overline{C}}$$

is activated when the decoder input digits $\overline{A}$, $\overline{B}$ and $\overline{C}$ are each at a binary one value. These expressions are significant in considering the operation of the circuit of FIGURE 3. In the decoder mode of operation, the matrix is adapted to receive three pairs of complementary decoder input signals A$\overline{A}$, B$\overline{B}$ and C$\overline{C}$. For the purpose of the present explanation, it will be assumed that the decoder digits ABC have the binary values 101 respectively. As previously stated, a binary "one" signal is considered to be a signal of substantial negative value, such as the voltage $V_H$ of FIGURE 2. In the present case, then, the decoder input terminals A, $\overline{B}$ and C will be at a negative voltage, while their complementary terminals $\overline{A}$, B and $\overline{C}$ will be substantially at ground potential. It is further assumed that a biasing voltage has been applied to each of the terminals BR so as to provide a bistable load line LL1, as explained in connection with FIGURE 2. With the assumed levels of the input signals, each tunnel diode stage is then adapted for AND logic bistable operation.

Tracing the propagation of a signal through each of the columns of the decoder-encoder, it will be seen that the application of a negative voltage at the decoder input terminal A provides a signal to each of the pair of input leads of the tunnel diode stage TD11. This will cause the stage TD11 to switch to its binary "one" state and thereby provide a stable negative voltage $V_H$ thereacross. The resultant negative output signal from stage TD11, together with a negative signal from the $\overline{B}$ decoder input terminal, causes the tunnel diode stage TD22 to switch to its high voltage stable state. Upon switching, the negative output signal from the tunnel diode stage TD22, in conjunction with the negative signal applied to the decoder input terminal C, causes the tunnel diode stage TD33 to switch to its high voltage stable state. Thus, the decoder binary input code 101 causes only one stage in each column to assume its high voltage state and provides a binary "one" signal on only one of the decoder output lines. In the present example, the latter line is labeled 101 in the drawing.

Following the decoding operation described above, each stage in each column that was set to the binary "one" state, must be reset to the binary "zero" state to ready the matrix for a subsequent operation. Resetting is accomplished by the simultaneous application of reset signals to all of the terminals BR. Thus the time required to perform the above-described decoding operation is the propagation time of a signal through all of the columns of the matrix plus the reset time of a tunnel side. Since the reset time can readily be made smaller than the forward switching time, the minimum time for a decoding operation is given by the equation:

$$t_D = nt_s + t_R \leq (n+1)t_s$$

where:

$t_s$ is the switching time of the tunnel diode,
$t_R$ is the reset time of the tunnel diode, and
$n$ is the number of binary digits to be coded.

Because of an inherent ability of the tunnel diode stages to store information, a time-shared operation of the decoder-encoder becomes possible. As an example, the apex column of the matrix can be independently reset and used for a subsequent decoding operation when the propagated signal reaches the base column of the matrix. Similarly the middle column can be used for a subsequent decoding operation when the propagated signal clears the third column of the matrix, and so on. Thus, the time between consecutive decoder outputs can be made as low as the propagation time through two tunnel diode columns, or approximately ten nanoseconds. In a conventional diode matrix, without the advantage of time-sharing, the time required for consecutive decoder output signals is the time required to propagate a decoder signal through all of the decoding columns, regardless of the size of the pyramid. As the number of digits to be decoded is increased, the propagation time of a conventional diode matrix may become prohibitive for many circuit applications.

The operation of the matrix shown in FIGURE 3 as an encoder will now be explained. It will be assumed that the encoder input terminal 101 has been selected by the application thereto of a negative signal. As was previously mentioned, during the encoding operation information is propagated from the base column towards the apex column of the pyramid matrix, i.e., from right to left in FIGURE 3 of the drawings. Further, during the encoding operation, the load line LL2 is established by the biasing source so as to require only a single signal applied to the output lead of a tunnel diode stage to switch the latter to its high voltage stable state.

In order to avoid the spurious propagation of information during the encoding operation, it is preferable that two adjacent columns of the matrix not be activated at the same time. To this end, adjacent columns of a multi-column matrix may have biasing signals applied thereto at alternate times. Thus, when a biasing signal is applied to the tunnel diode stages of the base and apex columns of the pyramid, the biasing source associated with the middle column is not activated.

When a negative signal is applied to the lead 101, tunnel diode stage TD33 is switched to its high voltage stable state, thus coupling a negative output signal, indicative of a binary one, through its associated rectifier diode to the encoder output terminal E$n$C. The encoder output terminal E$n\overline{C}$ is not affected by this operation and remains at approximately ground potential. The increased negative voltage at the cathode of the tunnel diode of stage TD33 is propagated toward the apex, i.e., by way of one input lead of the tunnel diode stage TD33 to the stage TD22. When a biasing voltage is subsequently applied to the stages of the middle column, the tunnel diode stage TD22 will switch to its high voltage state, thereby coupling a binary "one" signal to the encoder output terminal E$n\overline{B}$. The binary one signal established in the tunnel diode stage TD22 is subsequently propagated to the stage TD11 which, when subsequently activated, couples a binary one signal to the encoder output stage E$n$A. It is therefore possible to reverse the signal flow through the matrix to establish at the encoder output terminals a multi-digit signal indicative of the selected lead 101.

The present invention is directed to apparatus which selectively functions as a signal decoder or a signal encoder device. Use of tunnel diode stages in the combined decoder-encoder permits it to operate at high speed. Moreover, because of its ability for temporary signal storage it permits time-sharing of the device to further diminish the time required for successive decoding or encoding operations. Ultimately, the time for successive decoding or encoding operations need only be the switching time for a pair of tunnel diode stages. Further, because of the storage capability of the individual tunnel diode stages, it is only necessary to retain the decoder input signal information at the terminals of the device until such time as information has been propagated to another column of the matrix.

The number of tunnel diodes required for the combined decoder-encoder which forms the subject matter of the present invention is far less than that required for a pyramid matrix formed of conventional diode devices. The number of tunnel diodes $m$ required for the decoding of $n$ binary digits is given by the equation $$m = 2(2^n - 1)$$

For the decoding of eight binary digits, a pyramid decoder formed of conventional diodes is known to require 1016 such diodes. In the present invention, only 510 tunnel diodes are required. As the number of binary digits to be decoded is increased, the savings in components become even more pronounced.

Various modifications of applicants' invention are possible to obtain different operating characteristics. One such modification is the biasing of the tunnel diode stages for monostable rather than for bistable logic operation. When the circuit is operated in this manner, the encoder and decoder signals must be applied throughout the decoding or encoding operation. While time-sharing of the decoder-encoder is no longer available under these conditions, bilateral circuit operation for decoding and encoding is still possible and the reduction in the number of components is similarly realized.

While in accordance with the provisions of the statutes there has been illustrated and described the best form of the invention known, it will be apparent to those skilled in the art that changes may be made in the apparatus described without departing from the spirit of the invention, as set forth in the appended claims and, in some cases, certain features of the invention may be used to advantage without corresponding use of other features.

Having now described the invention, what is claimed as new and novel and for which it is desired to secure Letters Patent is:

1. A pyramid-organized matrix comprising a sequence of interconnected columns of separate stages, the number of stages in said sequence of columns increasing in size between the apex and the base of the pyramid, each of said stages including bistable signal storage means, means corresponding to each column for applying decoder signals to each stage thereof, means corresponding to each stage for receiving a decoded signal from the preceding column of said sequence, said last-recited means being selectively adapted to apply an encoded signal from each of said stages to the preceding column, means in each stage responsive to the coincidence of the corresponding decoder signal and the decoded signal applied thereto from the preceding column in said sequence to switch the bistable signal storage means of said stage, means responsive to said switching action to derive a decoded signal for application to a plurality of stages in the subsequent column of said sequence, means responsive to an encoded signal received by a selected stage of a given column for switching the bistable signal storage means of said stage, and means responsive to said last-recited switching action for deriving an encoder signal from said given column and from each column preceding said given column in said sequence.

2. The apparatus of claim 1 and further including means associated with each stage for biasing the bistable signal storage means thereof to selectively accept decoded or encoded signals.

3. The apparatus of claim 1 wherein each of said bistable signal storage means has a voltage-current characteristic including a negative resistance region intermediate a pair of positive resistance regions.

4. The apparatus of claim 3 wherein each of said bistable signal storage means includes a tunnel diode.

5. A pyramid-organized matrix comprising a sequence of interconnected columns of separate stages, the number of stages in said sequence of columns increasing in size between the apex and the base of the pyramid, means corresponding to each column for applying decoder signals to each stage thereof, means corresponding to each stage for receiving a decoded signal from the preceding column of said sequence, said last-recited means being selectively adapted to apply an encoded signal from each of said stages to the preceding column, means for deriving a decoded signal from each stage upon the coincidence of the corresponding decoder signal and the decoded signal applied thereto from the preceding column in said sequence, means for applying each of said decoded signals to a plurality of stages in the subsequent column of said sequence, and means responsive to an encoded signal received by a selected stage of a given column for deriving an encoder signal from said given column and from each column preceding said given column in said sequence.

6. A pyramid-organized matrix comprising a sequence of interconnected columns of separate stages, the number of stages in said sequence of columns increasing in size between the apex and the base of the pyramid, each of said stages including bistable signal storage means, means corresponding to each column for applying decoder signals to each stage thereof, means corresponding to each stage for receiving a decoded signal from the preceding column of said sequence, means in each stage responsive to the coincidence of the corresponding decoder signal and the decoded signal applied thereto from the preceding column in said sequence to switch the bistable signal storage means of said stage, and means responsive to said switching action to derive a decoded signal for application to a plurality of stages in the subsequent column of said sequence.

7. A pyramid-organized matrix comprising a sequence of interconnected columns of odd and even stages, the number of stages in said sequence of columns increasing in size between the apex and the base of the pyramid, ach of said stages including bistable signal storage means, means corresponding to each column for applying a decoder signal to each odd stage thereof, means corresponding to each column for applying the complement of said last-recited decoder signal to each even stage thereof, means corresponding to each stage for receiving a decoded signal from the preceding column of said sequence, means in each stage responsive to the coincidence of the corresponding decoder signal and the decoded signal applied thereto from the preceding column in said sequence to switch the bistable storage means of said stage, and means responsive to said switching action to derive a decoded signal for application to a pair of stages in the subsequent column of said sequence.

8. A pyramid-organized matrix selectively adapted to operate as a decoder or as an encoder, comprising a sequence of interconnected columns of odd and even stages, the number of stages in said sequence of columns increasing in size between the apex and the base of the pyramid, each of said stages including bistable signal storage means, means corresponding to each column for applying a decoder signal to each odd stage thereof, means corresponding to each column for applying the complement of said last-recited decoder signal to each even stage thereof, means corresponding to each stage for receiving a decoded signal from the preceding column of said sequence, means in each stage responsive to the coincidence of the corresponding decoder signal and the decoded signal applied thereto from the preceding column in said sequence to switch the bistable signal storage means of said stage, means responsive to said switching action to derive a decoded signal for application to a plurality of stages in the subsequent column of said sequence, means responsive to an encoded signal received by a selected stage of a given column for switching said bistable signal storage means of said stage, and means responsive to said last-recited switching action for deriving an encoder signal from said given column and from each column preceding said given column in said sequence.

9. A pyramid-organized decoder-encoder matrix comprising a sequence of interconnected columns of odd and even stages, the number of stages in said sequence of columns increasing in size between the apex and the base of the pyramid, each of said stages including a tunnel diode adapted to be switched to either one of a pair of stable states, means corresponding to each column for resistively applying a decoder signal to each odd stage thereof, means corresponding to each column for resistively applying the complement of said last-recited decoder signal to each even stage thereof, resistive means corresponding to each stage for receiving a decoded signal from the preceding column of said sequence, said last-recited means being selectively adapted to apply an encoded signal from each of said stages to the preceding column, means in each stage responsive to the coincidence of the corresponding decoder signal and the decoded signal applied thereto from the preceding column in said sequence to switch the tunnel diode of said stage, means responsive to said switching action to derive a decoded signal for application to a pair of stages in the subsequence column of said sequence, means responsive to an encoded signal received by a selected stage of a given column for switching the tunnel diode of said stage, and unilaterally conductive means responsive to said last-recited switching action for deriving encoder signals from said given column and from each column preceding said given column in said sequence.

10. The apparatus of claim 9 and further including means associated with each stage for resistively coupling a selected one of a pair of biasing voltages to said tunnel diode to adapt said matrix for operation in either the decoder or the encoder mode.

11. A combined decoder-encoder circuit comprising a pyramid-organized switching matrix including successive columns of substantially identical stages beginning with an apex column and terminating with a base column, each of said columns having a pair of complementary decoder input terminals and a pair of complementary encoder output terminals associated therewith, each stage within a column comprising a tunnel diode having its anode connected to ground and its cathode connected to a junction point, means for resistively applying a biasing voltage and a reset signal to said junction point, first and second leads resistively coupled to said junction point, a third lead coupled to said junction point, and a rectifier diode having its cathode connected to said junction point, the stages within each column being arranged in pairs, each stage within a column having its third lead jointly connected to the first leads of one of said pairs of stages in the succeeding column, each pair of said stages within a column having the second leads thereof respectively connected to different ones of the associated pair of decoder input terminals, the first lead of each apex column stage being connected to the second lead of the same stage, the rectifier diodes corresponding to each pair of said stages within a column having the anodes thereof connected to different ones of the associated pair of encoder output terminals, a selected one of the third leads of said base column stages being adapted to provide an output signal in response to input signals applied to said decoder input terminals, said encoder output terminals being adapted to provide output signals in response to an input signal applied to a selected one of said last-recited third leads.

No references cited.

ARTHUR GAUSS, *Primary Examiner.*

R. H. PLOTKIN, *Assistant Examiner.*